United States Patent
Primus et al.

(10) Patent No.: US 10,774,771 B2
(45) Date of Patent: Sep. 15, 2020

(54) ENGINE CONTROL SYSTEM FOR REDUCING PARTICULATE MATTER

(71) Applicant: General Electric Company, Schenectady, NY (US)

(72) Inventors: Roy James Primus, Niskayuna, NY (US); Thomas Michael Lavertu, Clifton Park, NY (US); Adam Edgar Klingbeil, Bailston Lake, NY (US)

(73) Assignee: GE GLOBAL SOURCING LLC, Norwalk, CT (US)

( * ) Notice: Subject to any disclaimer, the term of this patent is extended or adjusted under 35 U.S.C. 154(b) by 5 days.

(21) Appl. No.: 15/061,522

(22) Filed: Mar. 4, 2016

(65) Prior Publication Data
US 2017/0254286 A1 Sep. 7, 2017

(51) Int. Cl.
| F02D 41/30 | (2006.01) |
| F02D 41/18 | (2006.01) |
| F02D 41/14 | (2006.01) |
| F02D 41/40 | (2006.01) |
| F02D 41/26 | (2006.01) |
| F02M 65/00 | (2006.01) |

(52) U.S. Cl.
CPC ....... *F02D 41/182* (2013.01); *F02D 41/1458* (2013.01); *F02D 41/263* (2013.01); *F02D 41/3011* (2013.01); *F02D 41/405* (2013.01); *F02M 65/001* (2013.01); *F02D 41/266* (2013.01); *Y02T 10/44* (2013.01)

(58) Field of Classification Search
CPC .. F02D 41/182; F02D 41/3011; F02D 41/263; F02M 65/001
See application file for complete search history.

(56) References Cited

U.S. PATENT DOCUMENTS

| 4,696,276 A * | 9/1987 | Flaig | G07C 5/0841 |
| | | | 123/478 |
| 6,243,641 B1 * | 6/2001 | Andrews | G01M 15/08 |
| | | | 123/436 |
| 6,371,077 B1 * | 4/2002 | McGee | F02D 41/3064 |
| | | | 123/299 |
| 6,434,929 B1 * | 8/2002 | Nishimura | F02D 21/08 |
| | | | 60/278 |
| 6,594,990 B2 | 7/2003 | Kuenstler et al. | |
| 6,705,277 B1 * | 3/2004 | McGee | F02D 41/38 |
| | | | 123/27 R |

(Continued)

OTHER PUBLICATIONS

Choi et al, "Comparison of the effects of multiple injection strategy on the emissions between moderate and heavy EGR rate conditions: part 2—post injections", Journal of Mechanical Science and Technology, vol. 27 Issue: 7 pp. 2217-2223.

*Primary Examiner* — David Hamaoui
(74) *Attorney, Agent, or Firm* — The Small Patent Law Group LLC; Philip S. Hof

(57) ABSTRACT

A control system for an engine includes one or more processors configured to determine when a change in one or more of oxygen or fuel supplied to an engine. The one or more processors also are configured to, responsive to determining the change in oxygen and/or fuel supplied to an engine, direct one or more fuel injectors of the engine to begin injecting fuel into one or more cylinders of the engine during both a first fuel injection and a second fuel injection during each cycle of a multi-stroke engine cycle of the one or more cylinders.

19 Claims, 4 Drawing Sheets

(56) References Cited

U.S. PATENT DOCUMENTS

| | | | |
|---|---|---|---|
| 7,240,660 B1* | 7/2007 | Bryant | F02D 41/0087 |
| | | | 123/299 |
| 7,360,522 B2* | 4/2008 | Tamma | F02D 41/402 |
| | | | 123/299 |
| 7,584,618 B2* | 9/2009 | Amiot | F01D 11/24 |
| | | | 60/782 |
| 7,938,098 B2* | 5/2011 | Ashizawa | F02D 41/401 |
| | | | 123/294 |
| 8,302,385 B2 | 11/2012 | Sujan | |
| 8,434,297 B2* | 5/2013 | Asanuma | B01D 53/9409 |
| | | | 60/285 |
| 8,527,183 B2* | 9/2013 | Gallagher | F02D 35/024 |
| | | | 123/456 |
| 8,903,632 B2 | 12/2014 | Peters et al. | |
| 8,944,036 B2 | 2/2015 | Klingbeil | |
| 9,140,179 B2 | 9/2015 | Primus et al. | |
| 9,284,909 B2* | 3/2016 | Wooldridge | F02D 43/00 |
| 9,341,106 B2* | 5/2016 | Hayase | F01P 7/165 |
| 9,422,885 B2* | 8/2016 | Prothmann | F02D 41/008 |
| 9,427,704 B2* | 8/2016 | Bisaiji | F01N 3/36 |
| 9,518,521 B2* | 12/2016 | Lavertu | F02D 41/1444 |
| 2006/0086083 A1* | 4/2006 | Yacoub | F01N 3/0842 |
| | | | 60/286 |
| 2012/0298070 A1 | 11/2012 | Akinyemi et al. | |
| 2014/0174406 A1 | 6/2014 | Rasmussen | |
| 2015/0017070 A1* | 1/2015 | Yamane | F02D 41/405 |
| | | | 422/119 |
| 2015/0176509 A1* | 6/2015 | Lavertu | F02D 19/0647 |
| | | | 123/27 GE |
| 2015/0285180 A1 | 10/2015 | Prothmann et al. | |
| 2016/0017826 A1 | 1/2016 | Lavertu et al. | |
| 2016/0084181 A1* | 3/2016 | Henry | F02M 26/43 |
| | | | 123/568.21 |
| 2016/0208721 A1* | 7/2016 | Wakimoto | G01N 27/4074 |
| 2016/0333814 A1* | 11/2016 | Lavertu | F02D 41/1454 |
| 2017/0284282 A1* | 10/2017 | Ochi | F02D 41/0057 |

* cited by examiner

ENGINE CONTROL SYSTEM FOR REDUCING PARTICULATE MATTER

FIELD

The subject matter described herein relates to internal combustion engines, and to control systems for reducing particulate matter emissions of the engines.

BACKGROUND

Engines include a plurality of cylinders having combustion chambers with pistons disposed in the combustion chambers. Intake air is directed into the combustion chambers by air handling systems of the engines and is compressed in the combustion chambers. Fuel is injected into the combustion chambers at a fuel injection time and is ignited. The ignited fuel generates pressure in the combustion chamber that moves the piston. The ignition of the fuel creates gaseous exhaust in the combustion chambers that is at least partially carried out of the engine by the air handling systems.

Over time, the subsystems of the engines wear and/or deteriorate. These subsystems include the air handling, cooling and fuel systems, which are critical to meeting emissions regulations. As the subsystems wear, there may be an increase in particulate matter (PM) that is generated and/or output from the combustion chambers of the engine. This poses a risk that the engines will exceed emissions restrictions or standards.

BRIEF DESCRIPTION

In one embodiment, a control system for an engine includes one or more processors configured to determine a change in one or more of oxygen or fuel supplied to an engine. The one or more processors also are configured to, responsive to determining the change in the one or more of oxygen or fuel supplied to the engine, direct one or more fuel injectors of the engine to begin injecting fuel into one or more cylinders of the engine during both a first fuel injection and a second fuel injection during each cycle of a multi-stroke engine cycle of the one or more cylinders.

In one embodiment, a method for controlling an engine includes determining when an oxygen-to-fuel ratio (OFR) of an engine decreases below at least a first threshold and, responsive to determining that the OFR of the engine has decreased below the at least the first threshold, directing one or more fuel injectors of the engine to begin injecting fuel into one or more cylinders of the engine during both a first fuel injection and a second fuel injection during each cycle of a multi-stroke cycle of the one or more cylinders.

In one embodiment, a control system for an engine includes a temperature sensor configured to obtain temperature measurements in one or more of an intake manifold of the engine or in air that is output from a compressor disposed upstream from the engine, a pressure sensor configured to obtain pressure measurements in the one or more of the intake manifold of the engine or the air that is output from the compressor, and one or more processors configured to examine the temperature measurements and the pressure measurements in order to identify a decrease in an oxygen-to-fuel ratio (OFR) of the engine. The one or more processors also are configured to, responsive to identifying the decrease in the OFR of the engine, direct fuel injectors of the engine to begin injecting fuel into cylinders of the engine during both a primary fuel injection and a post fuel injection during each engine cycle of the cylinders.

DETAILED DESCRIPTION

Figure 1:
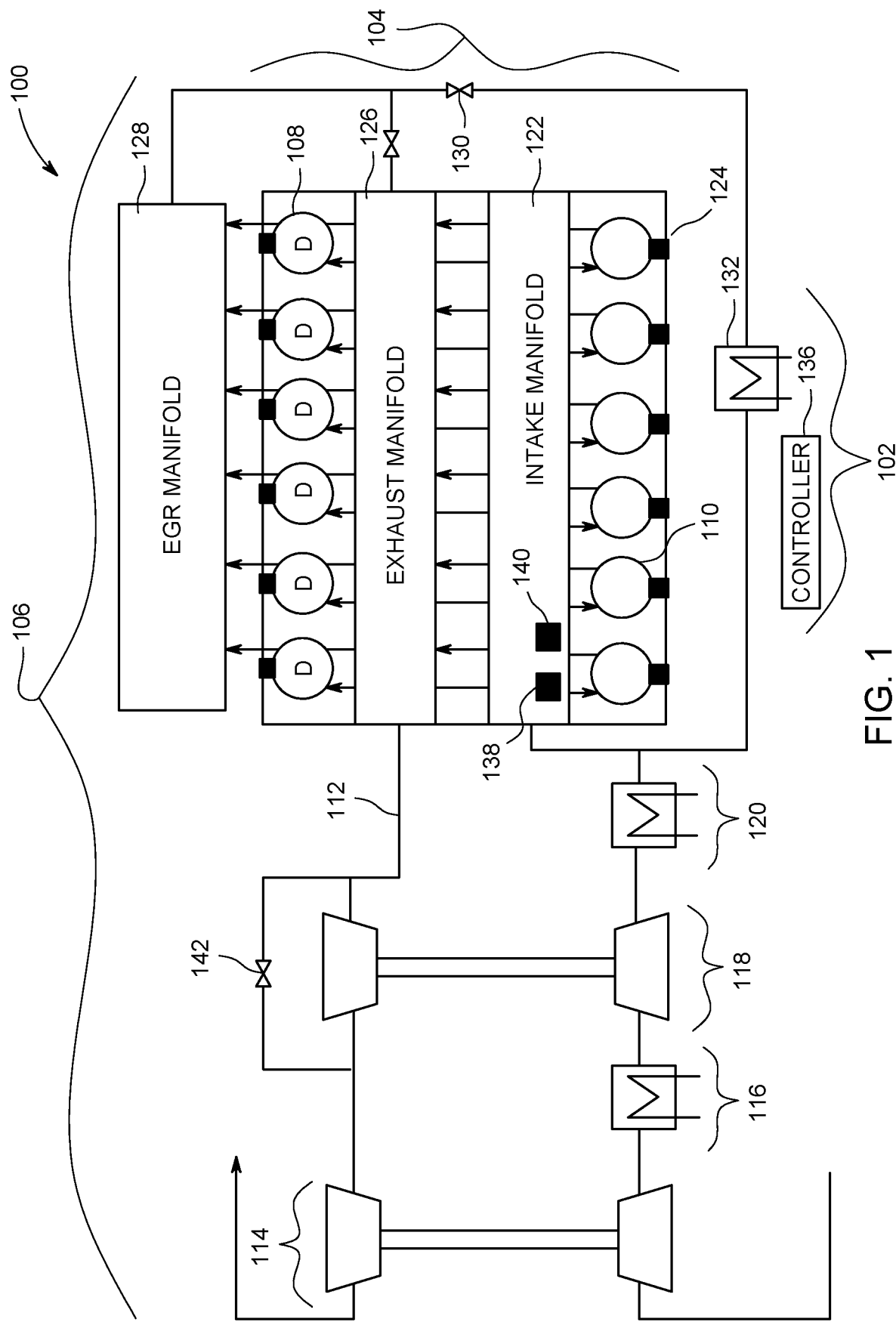
FIG. 1 is a schematic diagram of an engine system and an engine control system in accordance with one embodiment.

An engine control system is provided that reduces particulate matter formed in an engine by changing the injection of fuel into the combustion chambers of cylinders in the engine. The control system detects aging or deterioration in an engine subsystem of the engine based on changes in an oxygen-to-fuel ratio (OFR) of the air received into an intake manifold of the engine. The OFR can be expressed as a mass of intake oxygen (e.g., oxygen received into the intake manifold) divided by a mass of fuel flow into one or more cylinders. In response to detecting that the engine is not delivering the OFR to the cylinders in the engine per previous or initial operation of the engine at a given operating condition, the control system can begin injecting fuel into the combustion chambers of the cylinders at least a second time during a multi-stroke engine cycle of the cylinders. For example, each engine cycle of a cylinder may include an intake stroke where an air is supplied to the combustion chamber, a subsequent compression stroke where fuel is introduced into the combustion chamber to mix with the air and where a piston moves in a combustion chamber to compress the air and fuel mixture in the combustion chamber, a power stroke where the air and fuel mixture is ignited and power is extracted from the reacting mixture, and an exhaust stroke where the spent air and fuel mixture is expelled from the combustion chamber. The control system may direct fuel injectors to inject fuel during an additional, or post, injection subsequent to the primary injection in response to detecting that the OFR of the cylinders in the engine is decreasing per previous or initial operation of the engine. This secondary fuel injection can be referred to as a post injection. The post injection may inject a much smaller amount of fuel than the primary fuel injection (e.g., less than 33%, less than 15%, less than 10%, etc., than the primary fuel injection), and can reduce the generation of particulate matter in the engine and air handling system.

There are numerous ways to calculate an equivalent to OFR including air-fuel-ratio (AFR), Fuel-air-ratio (FAR), equivalence ratio, excess air ratio mixture fraction, and the like.

As deposits of particulate matter form on air handling components of the air handling system of the engine (e.g., turbine blades, exhaust gas recirculation valves, heat exchangers, manifolds, etc.), and as these components wear, there is an overall loss in air handling efficiency. Small leaks may also develop in the air-handling system, removing air form the system and reducing the airflow into the cylinders. This results in a drop in airflow for a given engine operating condition. The decrease in airflow translates into a lower OFR for the engine cylinders during the engine cycle. As the OFR drops, the amount of particulate matter generated will increase. Utilizing the post injection reduces the emission of particular matter by oxidizing the particulate matter that has been generated within the combustion chambers, thereby making the overall engine and air handling system more robust for compliance with emissions restrictions. Utilizing the post fuel injection reduces the generation of particulate matter, which also can extend the useful life of components of the engine and/or air handling system, and may extend the time periods between servicing the engine and/or air handling system.

As components of the fuel system wear, the injection profile can change, resulting in degraded performance, loss in engine efficiency and decreased OFR. As other components of the engine wear, fuel economy can be degraded, resulting in decreased OFR.

FIG. 1 is a schematic diagram of an engine system 100 and an engine control system 102 in accordance with one embodiment. The engine system 100 includes an engine 104 and an air handling system 106. The engine 104 includes several cylinders 108, 110 that operate according to multiple engine cycles to generate power, such as the four stroke engine cycle described above. Alternatively, the engine may operate with a different number of strokes such as a two stroke engine. The cylinders 108 may be donating cylinders that recirculate the exhaust gas back into the intake manifold (described below). The cylinders 110 may be non-donating cylinders from which the exhaust is not recirculated. Alternatively, a different number and/or arrangement of the cylinders 108 and/or 110 may be provided, including an engine that does not include any donating cylinders 108.

The air handling system 106 includes several conduits 112 that direct air and exhaust through the engine 104. The conduits 112 direct air from outside the engine system 100 into a primary or first turbocharger 114 of the air handling system 106, through a first heat exchanger 116 that cools the air, optionally through a secondary or second turbocharger 118, optionally through a second heat exchanger 120 that cools the air, and into an intake manifold 122 of the air handling system 106. The air in the intake manifold 122 may include air from outside the engine system 100 and/or recirculated exhaust. The air in the intake manifold is directed into the cylinders 108, 110 (e.g., during engine cycles of the cylinders 110). Several fuel injectors 124 of the engine system 100 receive fuel from a fuel tank (not shown) and inject fuel into the cylinders 108, 110. In one embodiment, the fuel injectors 124 direct the fuel directly into the cylinders 108, 110.

Exhaust from the cylinders 110 is directed by the conduits 112 of the air handling system 106 into an exhaust manifold 126 of the air handling system 106. Exhaust from the cylinders 108 is directed into an exhaust gas recirculating (EGR) manifold 128 of the air handling system 106, and then is directed by the conduits 112 and an optional valve 130 into a third heat exchanger 132 to cool the exhaust. The cooled exhaust is directed by the conduits 112 back into the intake manifold 122 as recirculated gas, where the recirculated gas is mixed with air from outside of the engine 104. Optionally, another valve 134 may direct some exhaust back into the exhaust manifold 126. Exhaust in the exhaust manifold 126 may be directed by the conduits 112 back into the second turbocharger 118, then into the first turbocharger 114, and then out of the engine system 100. Alternatively, another valve 142 may be used to cause the exhaust to bypass the second turbocharger 118. Optionally, the engine may not include an EGR manifold 128 and/or the exhaust from the cylinders 108 may not be recirculated.

The control system 102 includes a controller 136 and sensors 138, 140 operably coupled with the controller 136. For example, the controller 136 may communicate with the sensors 138, 140 via one or more wired and/or wireless connections. The controller 136 can represent hardware circuitry that includes and/or is connected with one or more processors (e.g., one or more microprocessors, field programmable gate arrays, integrated circuits, etc.) that perform operations described herein. In one embodiment, the controller 136 is specially programmed to perform the operations described herein, such as according to a flowchart of one or more embodiments of methods described herein.

The sensors 138, 140 may be located within the intake manifold 122 of the air handling system 106 to measure characteristics of the air (e.g., air from outside the engine system and/or recirculated exhaust) that flows into the intake manifold 122 for being directed into the cylinders 108, 110. Optionally, one or more of the sensors 138, 140 may be located outside of the intake manifold 122, such as at an inlet to the intake manifold 122, in the conduit 112 leading into the intake manifold 122, or another location. In one embodiment, the sensor 138 is a temperature sensor that measures temperatures of the air in or going into the intake manifold 122 and the sensor 140 is a pressure sensor that measures pressures of the air in or going into the intake manifold 122. Optionally, one or more of the sensors 138, 140 may be located elsewhere, such as at or within the outlet of the compressor of the second turbocharger 118, in one or more conduits through which exhaust of the cylinders 108, 110 flows, in one or more components of the exhaust gas recirculation system, etc. In one embodiment, the sensors 138, 140 are located in both the intake manifold 122 and in the outlet of the compressor of the turbocharger 118.

The sensor 138 may include thermocouples that generate potentials representative of temperatures or changes in temperature in the air, a thermometer, or another device that can sense temperature and generate an output signal to the controller 136 that indicates temperature. The sensor 140 may be a piezoelectric strain gauge, a capacitive pressure sensor, an electromagnetic pressure sensor, or other device that can sense pressure of the air and generate an output signal to the controller 136 that indicates the pressure. In one embodiment, one of the sensors 138, 140 or an additional sensor may be an oxygen sensor that measures the amount of oxygen in the intake manifold 122. The controller 136 may monitor the rates of fuel flow from the fuel injectors 124 from mass flow sensors that are coupled with or included in the fuel injectors 124. Alternatively, the fuel injectors 124 may communicate the rates at which fuel flows from the fuel injectors 124 to the controller 136.

In one embodiment, the controller 136 may receive both pressure and temperature measurements from the sensors 138, 140. Alternatively, the controller 136 may receive only pressure measurements or only temperature measurements, but not both pressure and temperature measurements. The controller 136 examines the pressure and/or temperature measurements to detect changes in the OFR of the cylinders 108, 110. Optionally, the controller 136 may calculate and monitor values and/or changes in value of the OFR based on measure oxygen concentrations in the intake air, EGR, or exhaust streams and the rate or amount of fuel flowing from the injectors 124. The controller 136 may determine if the pressure and/or temperature measurements are changing for the same operative state of the engine 104. For example, the controller 136 may compare pressure measurements that are obtained during different time periods that the engine 104 is operating at the same power setting (e.g., notch or throttle setting) to determine if the pressure measurements are changing or changing by at least a threshold amount (e.g., at least 5%, at least 10%, etc.). As another example, the controller 136 may compare temperature measurements that are obtained during different time periods that the engine 104 is operating at the same power setting to determine if the temperature measurements are changing or changing by at least a threshold amount (e.g., at least 5%, at least 10%, etc.) or below the threshold value. The threshold value can change for different combinations of engine speed and torque. As another example, the controller 136 may compare temperature measurements that are obtained during different time periods that the engine 104 is operating at the same power setting and compare pressure measurements that are obtained during different time periods that the engine 104 is operating at the same power setting to determine if the temperature measurements are changing or changing by at least the threshold amount and the pressure measurements are changing by at least the threshold amount or to below a threshold value.

The controller 136 can examine the pressure and/or temperature measurements to determine whether the pressure measurements and/or the temperature measurements are changing in a manner that indicates the OFR of the engine is decreasing. Decreasing pressures can indicate that the air flow into the intake manifold 122 of the air handling system 106 is decreasing and, as a result, the OFR of the engine also is decreasing. Decreasing air flow in the intake manifold 122 can indicate that the amount of particulate matter emitted from the engine 104 is increasing. Changes in the temperature measurements may indicate decreases in the OFR. For example, a decrease in the discharge from the compressor can indicate a decrease in the airflow (and, therefore, a decrease in the OFR). As another example, an increasing discharge temperature from the compressor may occur if the compressor efficiency is decreasing and more fuel is needed, thereby resulting in a decreasing OFR.

Optionally, the controller 136 may calculate the OFR based on the measured amounts of oxygen in the intake manifold, in the exhaust, and/or in the air exiting an outlet of the compressor of the turbocharger 118 located upstream of the engine, and based on the amount or rate of fuel injected into one or more cylinders 108 and/or 110 by the injectors 124. The controller 136 may repeatedly calculate the OFR to determine whether the OFR is decreasing.

In one embodiment, the engine system 100 may include a soot sensor that detects the presence of soot (e.g., which forms at least part of the particulate matter) in the exhaust stream of the engine 104. The soot sensor may be one or more of the sensors 138, 140. Information provided by such a soot sensor to the controller 136 can be used by the controller 136 to determine when to begin (or terminate) the multiple fuel injections into the cylinders 108, 110.

Responsive to determining that the pressure and/or temperature measurements are changing in a manner that indicates the particulate matter generation is increasing engine and/or responsive to determining that the OFR is decreasing, the controller 136 may direct the fuel injectors 124 to provide a supplemental injection of fuel into the combustion chamber of the cylinders 108, 110. For example, subsequent to the primary injection of fuel into the cylinders 108, 110 that occurs during the compression stroke of the cylinders 108, 110, the fuel injectors 124 may inject an additional amount of fuel during a supplemental, or post, fuel injection. This supplemental fuel injection may occur after the primary fuel injection by the same fuel injectors 124. For example, upon completion of the primary fuel injection, the fuel injectors 124 may stop injecting fuel into the cylinders 108, 110 for at least a period of time (e.g., two to nine milliseconds), and then begin injecting fuel into the cylinders 108, 110 a second time.

Optionally, the controller 136 may switch from directing the fuel injectors 124 to providing a single primary injection of fuel to providing multiple fuel injections during each four stroke cycle of the engine based on a change in operating conditions of the engine. The change in operating conditions may result in a change in the amount of oxygen relative to fuel being supplied to the engine, which can result in an increase in particulate matter generated by the engine. For example, responsive to the amount of oxygen supplied to the engine decreasing due to the engine moving to a location that is higher in altitude than a previous location, the engine moving to a location that is in a valley or tunnel having less oxygen than a previous location, the engine moving to a location having stricter standards or limits (e.g., smaller limits) on the amount of allowable emissions from the engine relative to a previous location, the ambient temperature becoming warmer or hotter relative to a previous time and/or location, the ambient pressure changing (e.g., decreasing at higher altitudes) and/or the engine consuming more fuel while still operating at the same throttle setting, the controller 136 may instruct the fuel injectors 124 to begin injecting fuel at least twice during each four stroke cycle of the engine for each cylinder 108, 110.

In one embodiment, the controller 136 directs the fuel injectors 124 to inject fuel into the cylinders 108, 110 during the primary and post fuel injections that are separated by a designated amount of time that changes based on an operative or operating state of the engine 104. The operative state of the engine 104 may represent the load placed on the engine 104, such as a power setting (e.g., throttle or notch setting) of the engine 104. For greater loads or power settings, the delay between the primary and post fuel injections may be longer than for shorter loads or power settings. For example, the primary fuel injection and the post fuel injection may be separated in time by two to three milliseconds for smaller loads or power settings, but may be separated in time by one to two milliseconds (e.g., 1.5 milliseconds) for larger loads or power settings. Alternatively, the injections may be separated by different amounts of time. The post injection may last for a shorter time period than the primary fuel injection. For example, the post injection may last for 50%, 30%, 10%, or another fraction or percentage of the time that the primary injection lasts. Consequently, the post injection may inject less fuel than the primary injection, such as by injecting 50%, 30%, 10%, or another fraction or percentage of the fuel that is injected during the primary injection.

While the description herein focuses on a single additional fuel injection for the cylinders 108, 110, alternatively, multiple additional fuel injections may be used. For example, instead of injecting fuel during the primary fuel injection and the post fuel injection, a third, fourth, and so on, fuel injection also may occur to reduce particulate matter generated from the engine. The additional fuel injections beyond the primary fuel injection decreases the particulate matter generated from the engine by oxidizing the soot or other constituents of the particulate matter that is generated.

Figure 2:
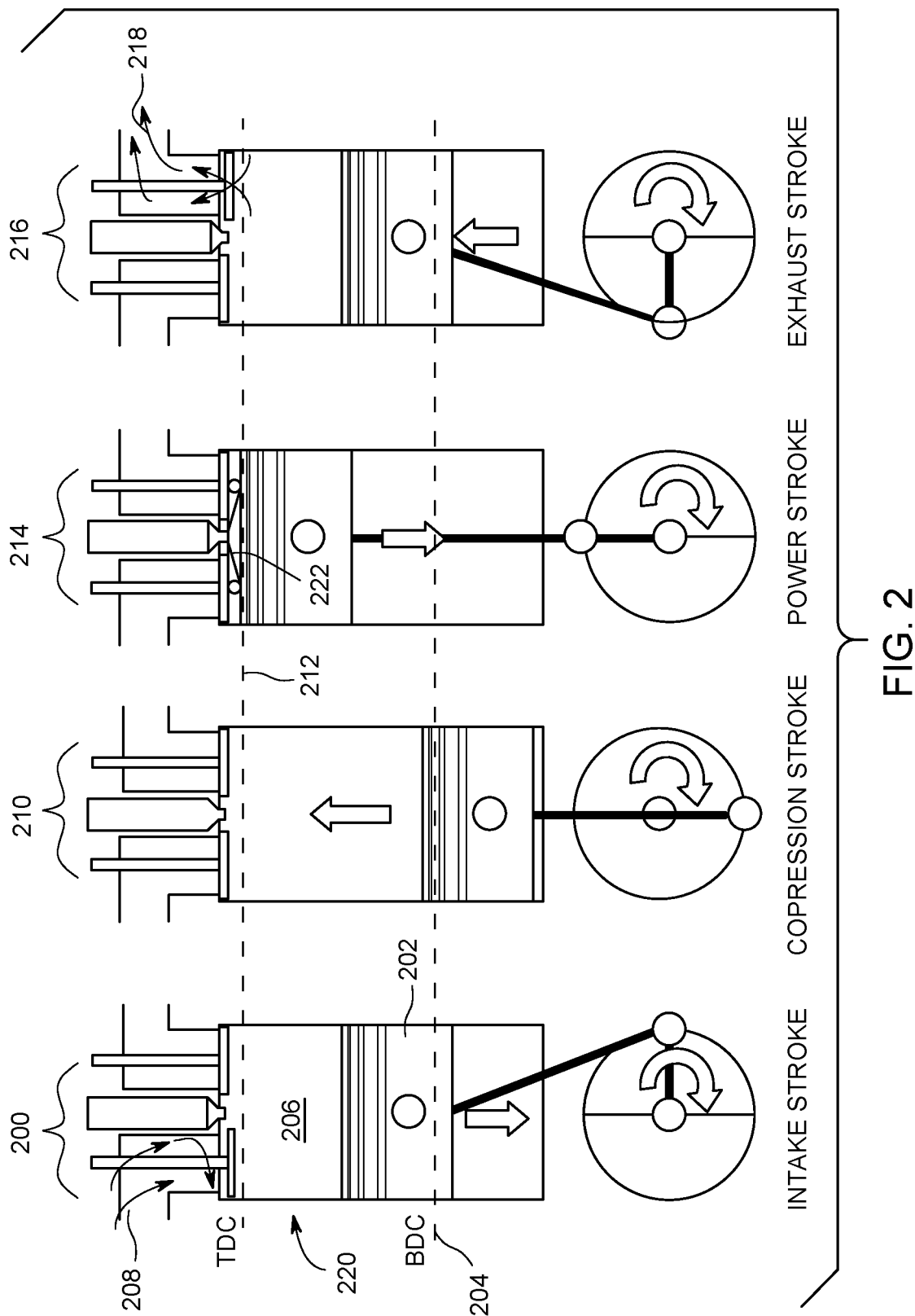
FIG. 2 illustrates a four stroke engine cycle for a cylinder according to one example.

FIG. 2 illustrates a four stroke engine cycle for a cylinder 220 according to one example. The cylinder 220 can represent one or more of the cylinders 108, 110 shown in FIG. 1. During an intake stroke 200 of the four stroke engine cycle, a piston 202 in a combustion chamber 206 of the cylinder 220 moves downward toward a bottom dead center (BDC) location or position 204 within the combustion chamber 206. Air 208 also is received into the combustion chamber 206 during the intake stroke 200.

During a compression stroke 210 of the four stroke engine cycle, the piston 202 moves upward from the BDC location or position 204 in the combustion chamber 206 toward a top dead center (TDC) location or position 212 in the combustion chamber 206. The air 208 is compressed within the combustion chamber 206 by this movement of the piston 202. Late in the compression stroke 210, fuel 222 is injected into the combustion chamber 206 above the piston 202. This fuel 222 can be injected during both the primary injection and at least one post injection, as described herein. The fuel can be injected during the primary injection beginning late in the compression stroke 210 and into a power stroke 214, or during only the power stroke 214. The fuel 222 is injected to create an air-and-fuel mixture within the combustion chamber 206. This mixture is ignited to cause combustion within the combustion chamber 206 of the cylinder 220. The piston 202 is moved downward from the TDC position 212 toward the BDC position 204. During an exhaust stroke 216 of the four stroke engine cycle, the piston 202 moves upward from the BDC position 204 toward the TDC position 212 of the intake stroke 200. During this movement, exhaust 218 from inside the combustion chamber 206 is forced out of the cylinder 220 by the upward movement of the piston 202.

Figure 3:
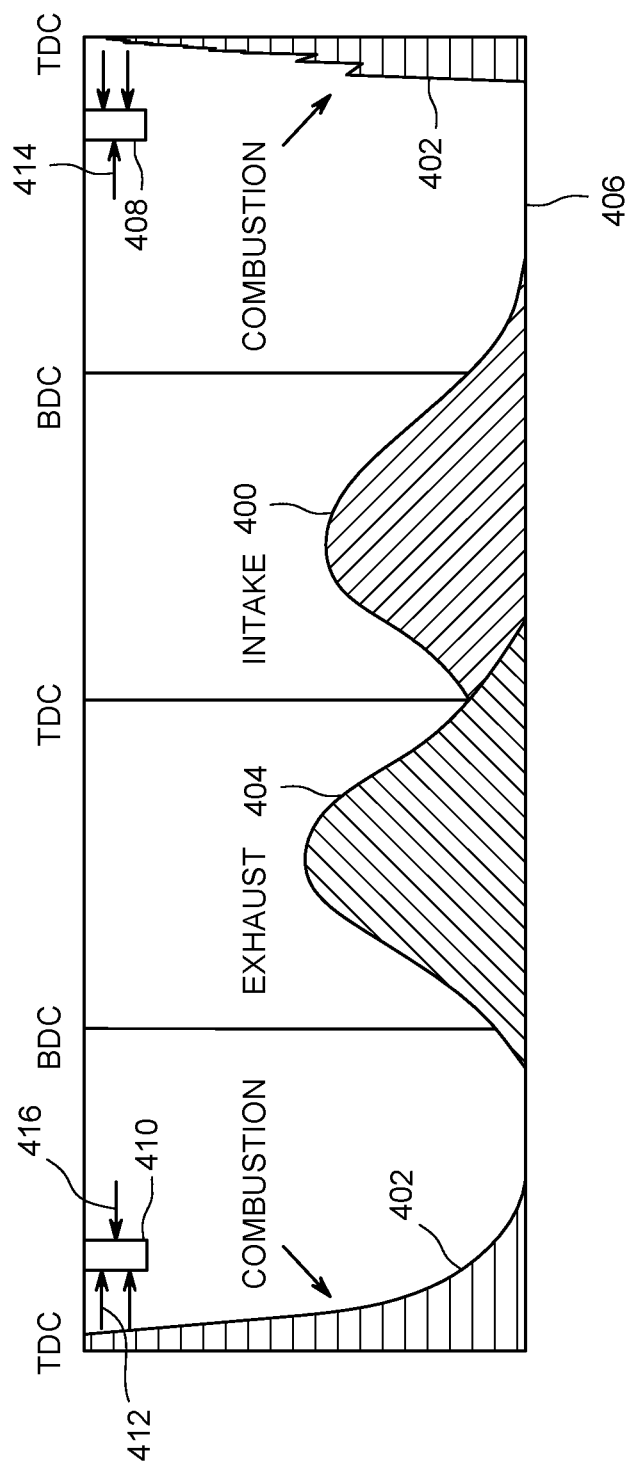
FIG. 3 illustrates a timing diagram of the four stroke engine cycle for the cylinder shown in FIG. 2.

The primary and post fuel injections may occur during the power stroke 214 in one embodiment. FIG. 3 illustrates a timing diagram of the four stroke engine cycle for the cylinder 220 shown in FIG. 2. The timing diagram includes several waveforms 400, 402, 404 shown alongside a horizontal axis 406 representative of time. Several vertical lines shown next to the labels BDC and TDC indicate the various positions of the piston 202 within the combustion chamber 206, with BDC indicating the times at which the piston 202 is at the BDC location 204 and TDC indicating the times at which the piston 202 is at the TDC location 212.

The waveform 400 represents the air 208 flowing into the combustion chamber 206 during the intake stroke 200 shown in FIG. 2. The waveform 402 represents the combustion of the air-and-fuel mixture during the power stroke 214 shown in FIG. 2. The waveform 404 represents the exhaust 218 that is forced out of the combustion chamber 206 during the exhaust stroke 216 shown in FIG. 2. The waveforms shown in FIG. 3 illustrate one of the four stroke engine cycles, with the combustion waveform 402 occurring during the power stroke 214 being split in two. The timeline shown in FIG. 3 may be repeated one or more additional times to illustrate additional four stroke engine cycles.

A primary fuel injection 408 and post fuel injection 410 also are shown in FIG. 3. The injections 408, 410 occur during the compression and power strokes 210, 214. The primary injection 408 occurs before combustion, and the post fuel injection 410 can occur after the primary injection 408, such as before or after the piston 202 reaches the TDC location. In one example, the post fuel injection 410 occurs within fifteen degrees of the TDC location.

The injections 408, 410 are separated in time by a time delay 412. The time delay 412 may change based on an operative state of the engine. For example, the time delay 412 may be shorter when the engine 104 is operating at a smaller notch or throttle setting that produces less power than a larger notch or throttle setting that produces more power. The time delay 412 may be longer when the engine 104 is operating at a larger notch or throttle setting that produces more power than a smaller notch or throttle setting that produces less power. The time delay 412 extends from the right edge of the primary injection 408 in the right side of FIG. 3 to the left edge of the post injection 410 in the left side of FIG. 3.

Additionally or alternatively, the injections 408, 410 occur over different time periods 414, 416. The time periods 414, 416 represent when the fuel injectors 124 inject fuel into the cylinder 220 during the respective injections 408, 410. In the illustrated embodiment, the post injection 410 injects fuel over a shorter time period than the primary injection 408. The time period 416 over which the post injection 410 injects fuel into the cylinder 220 may vary based on the operative state of the engine. For example, the time period 416 may be shorter when the engine 104 is operating at a smaller notch or throttle setting that produces less power than a larger notch or throttle setting that produces more power. The time period 416 may be longer when the engine 104 is operating at a larger notch or throttle setting that produces more power than a smaller notch or throttle setting that produces less power. As another example, the time period 416 may be shorter when the fuel injection pressures are higher and longer when the fuel injection pressures are lower.

The injections 408, 410 are shown as occurring on opposite sides of the time at which the piston 202 is at the TDC position 212 in FIG. 3. For example, the primary injection 408 may occur before the piston 202 reaches the TDC position 212 during upward movement of the piston 202 during the compression stroke 210 and the post injection 410 may occur after the piston 202 leaves the TDC position 212 and is moving downward toward the BDC position 204 during the power stroke 214. Alternatively, both injections 408, 410 may occur during the power stroke 214 and before the piston 202 reaches the TDC position 212 during the power stroke 214.

The post fuel injection into the cylinders 108, 110 can reduce the amount or rate at which particulate matter is generated within the engine 104. During initial operation of the engine 104, little to no particulate matter may be generated. Over time with increasing use of the engine 104, increasing amounts of particulate matter may be generated as components wear. Once the amount of particulate matter begins to increase, the controller 136 can detect the changing temperatures and/or pressures in the intake manifold 122 and begin directing the fuel injectors 124 to provide the post fuel injections. Optionally, the controller 136 can calculate the OFR based on the measured oxygen concentrations of the air exiting an outlet of the compressor of the turbocharger 118 that is upstream of the engine and/or in the intake manifold, and based on the rate or amount of fuel flowing out of the fuel injectors 124. If the temperatures and/or pressures return back to the levels prior to the changes caused by the particulate matter, the controller 136 may direct the fuel injectors 124 to stop providing the supplemental fuel injections.

While directing the fuel injectors 124 to provide a post or supplemental fuel injection may cause the useful life or service life of the fuel injectors 124 to decrease due to the increased usage of the injectors 124, this decrease in lifespan of the fuel injectors 124 may be offset by the increase in useful life or service life of the engine system 100 due to the decrease in particulate matter. For example, reducing the particulate matter can result in improved engine performance, which can allow the engine system 100 to operate longer between needed maintenance, service, or repair.

Figure 4:
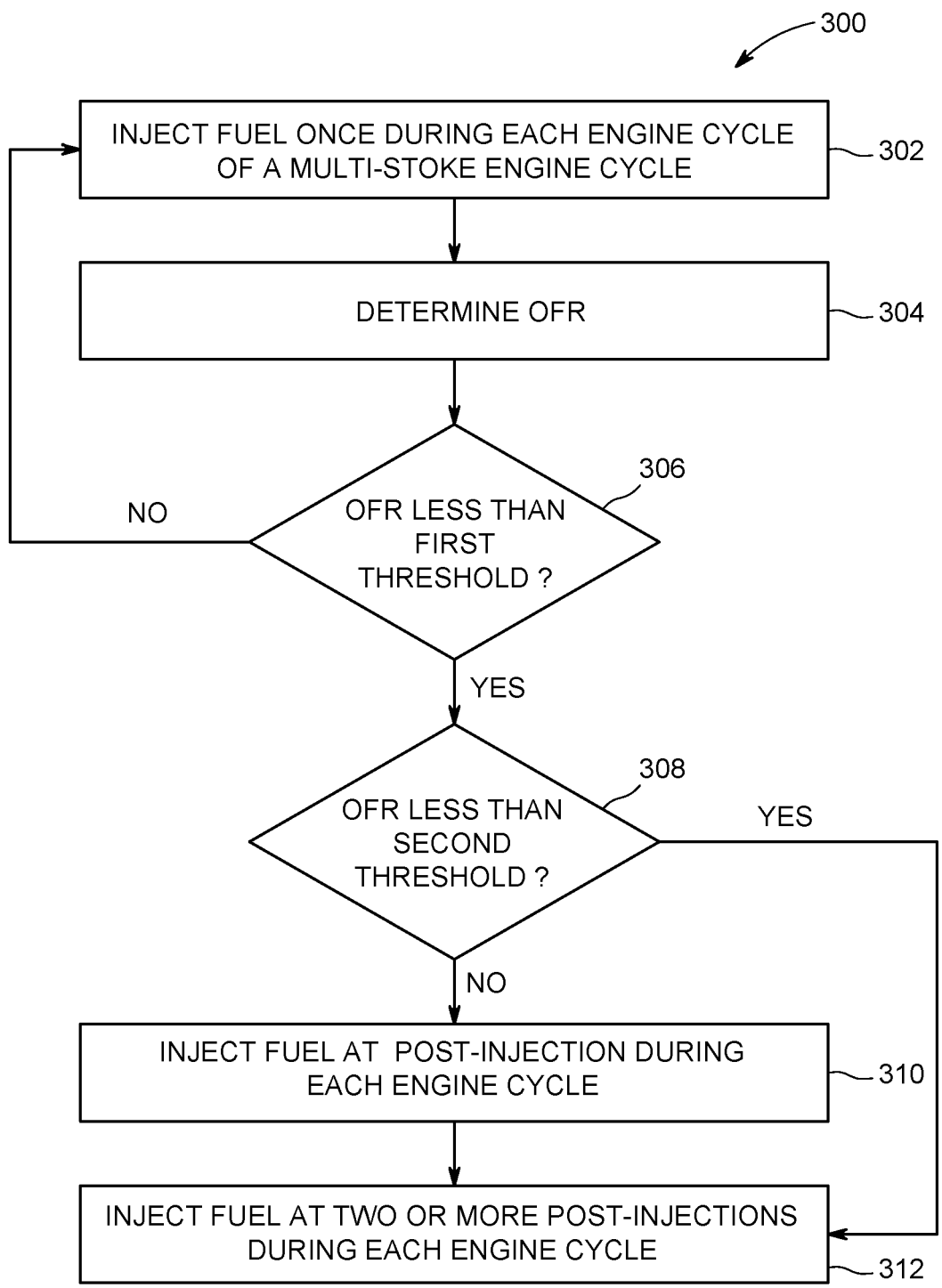
FIG. 4 illustrates a flowchart of one embodiment of a method for controlling operation of an engine system

FIG. 4 illustrates a flowchart of one embodiment of a method 300 for controlling operation of an engine system. The method 300 may be used to monitor OFR in the engine 104 and to control the injection of fuel into the cylinders 108, 110 of the engine 104 in order to reduce particulate matter generated from the engine system 100. The flowchart may represent programming of or may be used to program the controller 136 to perform the operations described herein in one embodiment.

At 302, fuel is injected into each cylinder of the engine once during each compression stroke of the engine cycles of the cylinders. This fuel injection may be referred to as the primary fuel injection, as described above. At 304, the OFR of the engine is determined. For example, temperature and/or pressure of the air (e.g., air and/or exhaust) flowing in or into the intake manifold of the engine are measured. The temperature and/or pressure may be repeatedly measured in order to identify changes in the temperature and/or pressure of this air. Optionally, one or more oxygen sensors and/or the rate at which fuel is flowing into the cylinders can be monitored. Some or all of this information can be examined in order to determine the OFR or to determine whether the OFR is changing (e.g., decreasing).

At 306, the OFR is compared to a first threshold to determine whether the OFR is less than the threshold. If the OFR of the engine is less than the first threshold, then the amount of particulate matter generated from the engine may be increasing. Flow of the method 300 may proceed toward 308 to determine how many post-injections to perform during each engine cycle to try and reduce the particulate matter. On the other hand, if the OFR is not less than the first threshold, then the amount of particulate matter generated by the engine may not be increasing. Flow of the method 300 may return toward 302 so that the engine may continue injecting fuel into the cylinders once during each cycle of the cylinders.

At 308, the OFR is compared to a smaller, second threshold to determine whether the OFR is less than the second threshold. If the OFR of the engine is less than both the first and second thresholds, then the amount of particulate matter generated from the engine may be increasing, and more than a single post injection may be needed to reduce the generation of particulate matter from the engine. As a result, flow of the method 300 may proceed toward 312. On the other hand, if the OFR is less than the first threshold but not less than the second threshold, then only a single post injection may be used to reduce the particulate matter. As a result, flow of the method 300 can proceed toward 310. The thresholds may be determined based on empirical studies of different engines to determine which thresholds may be used to identify when one or more post injections reduce the generation of particulate matter in the engine.

At 310, fuel is injected into the cylinders during a single post fuel injection once during each cycle of the cylinders. For example, after determining that the OFR has decreased below the first threshold, the fuel injectors may begin injecting fuel into the cylinders twice during each cycle of the cylinders (e.g., once during a primary injection and once during a single post injection). As described above, this can assist in reducing particulate matter generated by the engine.

At 312, fuel is injected into the cylinders during a two or more post fuel injections once during each cycle of the cylinders. For example, after determining that the OFR has decreased below the second threshold, the fuel injectors may begin injecting fuel into the cylinders at least three times during each cycle of the cylinders (e.g., once during a primary injection and at least twice during multiple post injections). As described above, this can assist in reducing particulate matter generated by the engine.

In one embodiment, a control system for an engine includes one or more processors configured to determine when an oxygen-to-fuel ratio (OFR) of an engine decreases. The one or more processors also are configured to, responsive to determining that the OFR of the engine decreases below at least a first threshold, direct one or more fuel injectors of the engine to begin injecting fuel into one or more cylinders of the engine during both a first fuel injection and a second fuel injection during each cycle of a multi-stroke engine cycle of the one or more cylinders.

Prior to the one or more processors determining that OFR of the engine decreases below at least the first threshold, the one or more processors can be configured to direct the one or more fuel injectors of the engine to inject the fuel into the one or more cylinders of the engine during only the first fuel injection during the engine cycle of the one or more cylinders. The one or more processors may be configured to determine that the OFR of the engine is decreasing responsive to one or more of a temperature measurement of the engine changing, a pressure measurement of the engine decreasing, a measurement of an amount of oxygen that is input into the engine decreasing, and/or a measurement of an amount of fuel injected into the one or more cylinders increasing relative to one or more of a previous temperature measurement, a previous pressure measurement, a previous measurement of the amount of oxygen, and/or a previous measurement of the amount of fuel with the engine operating in a common operative state when the one or more of the temperature measurement, the pressure measurement, the measurement of the amount of oxygen, and/or the measurement of the amount of fuel are obtained and when the one or more of the previous temperature measurement, the previous pressure measurement, the previous measurement of the amount of oxygen, and/or the previous measurement of the amount of fuel are obtained.

The one or more processors can be configured to obtain at least one of the temperature measurement and/or the pressure measurement of one or more of air in an intake manifold of the engine, air in an outlet of a turbocharger that is upstream of the engine, and/or exhaust from the engine. The one or more processors can be configured to change one or more of a period of time between the first fuel injection and the second fuel injection and/or a duration of the second fuel injection during the multiple stroke engine cycle of the one or more cylinders based on an operative state of the engine. This operative state can include one or more of a load placed on the engine and/or a throttle setting of the engine.

The one or more processors can be configured to, responsive to determining that the OFR of the engine decreases below a smaller, second threshold, direct the one or more fuel injectors to begin injecting the fuel into the one or more cylinders during the first fuel injection, the second fuel injection, and at least a third fuel injection during each cycle of the multi-stroke engine cycle.

In one embodiment, a method for controlling an engine includes determining when an oxygen-to-fuel ratio (OFR) of an engine decreases below at least a first threshold and, responsive to determining that the OFR of the engine has decreased below the at least the first threshold, directing one or more fuel injectors of the engine to begin injecting fuel into one or more cylinders of the engine during both a first fuel injection and a second fuel injection during each cycle of a multi-stroke cycle of the one or more cylinders.

The method also may include calculating the OFR based on a measured of amount of oxygen that is input into the engine and a measured of amount of fuel that is injected into the one or more cylinders. The method may include, prior to determining that the OFR of the engine has decreased below the at least the first threshold, directing the one or more fuel injectors of the engine to inject fuel into the one or more cylinders of the engine during only the first fuel injection during each cycle of the one or more cylinders.

Determining when the OFR of the engine decreases below the at least the first threshold may include determining one or more of a change in a temperature measurement of the engine, a decrease in a pressure measurement of the engine, a decrease in a measurement of an amount of oxygen input into the engine, and/or a measurement of an amount of fuel that is injected into the one or more cylinders.

The one or more of the temperature measurement, the pressure measurement, the measurement of the amount of oxygen, and/or the measurement of the amount of fuel may indicate the decrease in the OFR of the engine responsive to one or more of the temperature measurement changing, the pressure measurement decreasing, the measurement of the amount of oxygen decreasing, and/or the measurement of the amount of fuel increasing relative to one or more of a previous temperature measurement, a previous pressure measurement, a previous measurement of the amount of oxygen, and/or a previous measurement of the amount of fuel with the engine operating in a common operative state when the one or more of the temperature measurement, the pressure measurement, the measurement of the amount of oxygen, and/or the measurement of the amount of fuel are obtained and when one or more of a previous temperature measurement, a previous pressure measurement, the previous measurement of the amount of oxygen, and/or the previous measurement of the amount of fuel are obtained.

One or more of the temperature measurement and/or the pressure measurement can be measured in one or more of air in an intake manifold of the engine, air exiting an outlet of a turbocharger compressor disposed upstream of the engine, and/or an exhaust from the engine.

The method optionally can include changing one or more of a period of time between the first fuel injection and the second fuel injection and/or a duration of the second fuel injection during the multi-stroke engine cycle of the one or more cylinders based on an operative state of the engine.

In one embodiment, a control system for an engine includes a temperature sensor configured to obtain temperature measurements in one or more of an intake manifold of the engine or in air that is output from a compressor disposed upstream from the engine, a pressure sensor configured to obtain pressure measurements in the one or more of the intake manifold of the engine or the air that is output from the compressor, and one or more processors configured to examine the temperature measurements and the pressure measurements in order to identify a decrease in an oxygen-to-fuel ratio (OFR) of the engine. The one or more processors also are configured to, responsive to identifying the decrease in the OFR of the engine, direct fuel injectors of the engine to begin injecting fuel into cylinders of the engine during both a primary fuel injection and a post fuel injection during each engine cycle of the cylinders.

Prior to the one or more processors identifying the decrease in the OFR of the engine, the one or more processors can be configured to direct the fuel injectors of the engine to inject the fuel into the one or more cylinders of the engine during only the primary fuel injection during each power stroke of the engine cycle of the cylinders. The one or more processors may be configured to identify the decrease in the OFR of the engine responsive to one or more of the temperature measurements changing and/or the pressure measurements decreasing.

The one or more processors can be configured to identify the decrease in the OFR responsive to the one or more of the temperature measurements changing and/or the pressure measurements decreasing during time periods that the engine operates in a common operative state. The one or more processors may be configured to change a period of time between the primary fuel injection and the post fuel injection during the engine cycle of the one or more cylinders based on an operative state of the engine. The operative state can include one or more of a load placed on the engine or a throttle setting of the engine.

The one or more processors can be configured to direct the fuel injectors to begin injecting the fuel into cylinders of the engine during both the primary fuel injection and the post fuel injection during each engine cycle of the cylinders responsive to one or more of a decrease in an amount of oxygen supplied to the engine, the engine moving to a first location that is higher in altitude than a previous location of the engine, the engine moving to a second location that is in one or more of a valley or tunnel having less oxygen than the previous location, the engine moving to a third location having reduced limits on an amount of allowable emissions from the engine relative to the previous location, the engine moving to a fourth location having increased ambient temperatures relative to the previous location, and/or the engine consuming more fuel while still operating at a common throttle setting relative to a previous time.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A control system for an engine, the control system comprising:
    one or more processors configured to:
        determine an aging of a subsystem of an engine based on a decrease in an oxygen-to-fuel ratio (OFR) of the engine over time, wherein the decrease in the OFR is identified by determining whether one or more of a pressure or a temperature in the engine changes by at least a variable, threshold amount while the engine operates at a given power setting, wherein the variable threshold amount changes based on a combination of engine speed and engine torque; and
        direct one or more fuel injectors of the engine, responsive to determining the aging of the subsystem of the engine, to inject fuel into one or more cylinders of the engine during both a first fuel injection in a compression stroke and a second fuel injection in a power stroke of each of several multi-stroke engine cycles of the one or more cylinders to reduce generation of particulate matter in combustion chambers of the one or more cylinders of the engine,
    wherein the one or more processors are configured to direct the one or more fuel injectors to inject a smaller amount of fuel during the second fuel injection than during the first fuel injection,
    wherein the one or more processors are configured to direct the one or more fuel injectors to lengthen a temporal delay between an end of the first fuel injection in the compression stroke and a start of the second fuel injection in the power stroke responsive to the power setting of the engine increasing,
    wherein the one or more processors are configured to direct the one or more fuel injectors to shorten the temporal delay between the end of the first fuel injection in the compression stroke and the start of the second fuel injection in the power stroke responsive to the power setting of the engine decreasing.

2. The control system of claim 1, wherein the one or more processors are configured to direct the one or more fuel injectors to begin injecting the fuel during both the first fuel injection and the second fuel injection responsive to the OFR of the engine decreasing below at least a first OFR threshold.

3. The control system of claim 2, wherein the one or more processors are configured to, responsive to determining that the OFR of the engine decreases below a second OFR threshold that is smaller than the first OFR threshold, direct the one or more fuel injectors to also begin injecting the fuel into the one or more cylinders during at least a third fuel injection during each of the multi-stroke engine cycles.

4. The control system of claim 1, wherein, prior to the one or more processors determining the aging of the subsystem of the engine, the one or more processors are configured to direct the one or more fuel injectors of the engine to inject the fuel into the one or more cylinders of the engine during only the first fuel injection during each of the multi-stroke engine cycles of the one or more cylinders.

5. The control system of claim 1, wherein the one or more processors are configured to also determine the decrease in the OFR responsive to a measurement of an amount of fuel injected into the one or more cylinders increasing relative to a previous measurement of the amount of fuel injected into the one or more cylinders.

6. The control system of claim 1, wherein the one or more processors are further configured to change a duration of the second fuel injection based on an operative state of the engine.

7. The control system of claim 6, wherein the operative state includes one or more of a load placed on the engine or a throttle setting of the engine.

8. The control system of claim 1, wherein a duration of the second fuel injection is shorter than a duration of the first fuel injection.

9. The control system of claim 1, wherein the engine is a compression ignition type engine.

10. The control system of claim 1, wherein the amount of fuel injected during the second fuel injection is less than one-third of the amount of fuel injected during the first fuel injection.

11. The control system of claim 3, wherein third fuel injection occurs after the second fuel injection during each of the multi-stroke engine cycles, and wherein the one or more fuel injectors are directed to inject a smaller amount of fuel during the third fuel injection than during the first fuel injection.

12. A method for controlling an engine, the method comprising:
    determining an aging of a subsystem of an engine based on a decrease in an oxygen-to-fuel ratio (OFR) of the engine over time, wherein the decrease in the OFR is identified by determining whether one or more of a pressure or a temperature in the engine changes by at least a variable, threshold amount while the engine operates at a given power setting, wherein the variable threshold amount changes based on a combination of engine speed and engine torque;
    directing one or more fuel injectors of the engine, responsive to determining that the subsystem of the engine has aged, to inject fuel into one or more cylinders of the engine during both a first fuel injection in a compression stroke and a second fuel injection in a power stroke of each of several multi-stroke engine cycles of the one or more cylinders to reduce generation of particulate matter in combustion chambers of the one or more cylinders of the engine, wherein the one or more fuel injectors are directed to inject a smaller amount of fuel during the second fuel injection than during the first fuel injection;
    lengthening a temporal delay between an end of the first fuel injection in the compression stroke and a start of the second fuel injection in the power stroke responsive to the power setting of the engine increasing; and
    shortening the temporal delay between the end of the first fuel injection in the compression stroke and the start of the second fuel injection in the power stroke responsive to the power setting of the engine decreasing.

13. The method of claim 12, further comprising directing the one or more fuel injectors of the engine to inject the fuel into the one or more cylinders of the engine during only the first fuel injection during of the multi-stroke engine cycles of the one or more cylinders prior to determining the aging of the engine.

14. The method of claim 13, wherein determining the aging comprises also determining whether the OFR of the engine has decreased below a first OFR threshold based on a measurement of an amount of the fuel that is injected into the one or more cylinders.

15. The method of claim 14, wherein the measurement of the amount of fuel indicates the decrease in the OFR of the engine responsive to the measurement of the amount of fuel increasing relative to a previous measurement of the amount of fuel.

16. The method of claim 12, further comprising changing a duration of the second fuel injection based on a throttle setting of the engine.

17. A control system for an engine, the control system comprising:
    a temperature sensor configured to obtain temperature measurements in one or more of an intake manifold of the engine or in air that is output from a compressor disposed upstream from the engine;
    a pressure sensor configured to obtain pressure measurements in the one or more of the intake manifold of the engine or the air that is output from the compressor;
    one or more processors operatively coupled to the temperature sensor and the pressure sensor, wherein the one or more processors are configured to:
        determining an aging of a subsystem of the engine based on a decrease in an oxygen-to-fuel ratio (OFR) of the engine over time, wherein the decrease in the OFR is identified by determining whether one or more of the pressure measurements or the temperature measurements change by at least a variable, threshold amount while the engine operates at a given power setting, wherein the variable threshold amount changes based on a combination of engine speed and engine torque; and
        direct fuel injectors of the engine, responsive to the determination of the aging of the subsystem of the engine, to inject fuel into one or more cylinders of the engine during both a primary fuel injection in a compression stroke and a post fuel injection in a power stroke of each of several multi-stroke engine cycles of the one or more cylinders to reduce generation of particulate matter in combustion chambers of the one or more cylinders of the engine,
    wherein the one or more processors are configured to direct the one or more fuel injectors to inject a smaller amount of fuel during the post fuel injection than during the primary fuel injection,
    wherein the one or more processors are configured to direct the fuel injectors to lengthen a temporal delay between an end of the primary fuel injection in the compression stroke and a start of the post fuel injection in the power stroke responsive to the power setting of the engine increasing, and
    wherein the one or more processors are configured to direct the fuel injectors to shorten the temporal delay between the end of the primary fuel injection in the compression stroke and the start of the post fuel injection in the power stroke responsive to the power setting of the engine decreasing.

18. The control system of claim 17, wherein, prior to the determination of the aging of the subsystem of the engine, the one or more processors are configured to direct the fuel injectors of the engine to inject the fuel into the one or more cylinders of the engine during only the primary fuel injection during each power stroke of each of the multi-stroke engine cycles of the cylinders.

19. The control system of claim 17, wherein the one or more processors are configured to direct the fuel injectors to begin injecting the fuel into cylinders of the engine during both the primary fuel injection and the post fuel injection during each of the multi-stroke engine cycles of the cylinders responsive to one or more of:
    a change in ambient temperature,
    a change in ambient pressure, or
    a change in ambient oxygen.

* * * * *